(12) United States Patent
Trautwein et al.

(10) Patent No.: US 11,597,550 B2
(45) Date of Patent: Mar. 7, 2023

(54) DEVICE AND METHOD FOR DEGASSING AND GASSING CONTAINERS

(71) Applicant: OPTIMA consumer GmbH, Schwäbisch Hall (DE)

(72) Inventors: Herbert Trautwein, Kirchheim/Neckar (DE); Tobias Freiberger, Öhringen (DE)

(73) Assignee: OPTIMA consumer GmbH, Schwäbisch Hall (DE)

( * ) Notice: Subject to any disclaimer, the term of this patent is extended or adjusted under 35 U.S.C. 154(b) by 354 days.

(21) Appl. No.: 16/959,036

(22) PCT Filed: Jan. 7, 2019

(86) PCT No.: PCT/EP2019/050224
§ 371 (c)(1),
(2) Date: Jun. 29, 2020

(87) PCT Pub. No.: WO2019/137867
PCT Pub. Date: Jul. 18, 2019

(65) Prior Publication Data
US 2020/0339292 A1    Oct. 29, 2020

(30) Foreign Application Priority Data
Jan. 10, 2018   (DE) .......................... 102018200291.6

(51) Int. Cl.
   *B65B 31/02*   (2006.01)
   *B01D 39/12*   (2006.01)
   *B01D 46/00*   (2022.01)

(52) U.S. Cl.
   CPC ............ *B65B 31/025* (2013.01); *B01D 39/12* (2013.01); *B01D 46/0005* (2013.01); *B65B 31/022* (2013.01); *B01D 2273/28* (2013.01)

(58) Field of Classification Search
   CPC ..... B65B 31/022; B65B 31/025; B01D 39/12; B01D 46/0005; B01D 2273/28
   See application file for complete search history.

(56) References Cited

U.S. PATENT DOCUMENTS 2,170,469 A   8/1939   Carter
2,292,887 A   8/1942   McBean
(Continued)

FOREIGN PATENT DOCUMENTS

EP    0566173 A1    10/1993
WO    WO-0142086 A1 *  6/2001 ........... B65B 31/025
WO    2015/079571 A1   3/2017

OTHER PUBLICATIONS

Office Action dated Jun. 15, 2021 in connection with corresponding European Patent Application No. 19700766.9.
(Continued)

*Primary Examiner* — Robert Clemente
(74) *Attorney, Agent, or Firm* — Akerman LLP

(57) ABSTRACT

The invention relates to a device for degassing and gassing containers (3), comprising at least one chamber in which an open container can be accommodated for a degassing and/or gassing process, wherein a cover element (26) for the accommodated open container (3) is provided in the chamber, wherein, for a degassing and/or gassing process, the cover element (26) can be sealingly placed on a container edge (31) of an accommodated open container (3) or into an interior of an accommodated open container (3) and wherein the cover element (26) has at least one opening (260) for a passage of gas. The invention also relates to a method for degassing and gassing.

11 Claims, 5 Drawing Sheets

(56) References Cited

U.S. PATENT DOCUMENTS

| | | |
|---|---|---|
| 2,578,815 A | 12/1951 | Kronquest |
| 3,220,153 A | 11/1965 | Cormack, Jr. et al. |
| 3,332,201 A | 7/1967 | Cooper |
| 3,354,608 A | 11/1967 | Hart et al. |
| 3,605,826 A | 9/1971 | Carter |
| 4,221,102 A | 9/1980 | Lang et al. |
| 4,905,454 A | 3/1990 | Sanfilippo et al. |
| 5,217,050 A | 6/1993 | Varlet |
| 5,531,253 A | 7/1996 | Nishiyama et al. |
| 11,117,696 B2 | 9/2021 | Scott et al. |

OTHER PUBLICATIONS

International Search Report issued in connection with PCT/EP2019/050224.
First Office Action issued in connection with corresponding Chinese Patent Application No. 201980008091.4, dated Aug. 25, 2021.

\* cited by examiner

US 11,597,550 B2

DEVICE AND METHOD FOR DEGASSING AND GASSING CONTAINERS

CROSS-REFERENCE TO RELATED APPLICATIONS

This application is a national phase of PCT/EP2019/050224, filed Jan. 7, 2019, and claims priority to DE102018200291.6, filed Jan. 10, 2018, the entire contents of both of which are hereby incorporated by reference.

FIELD OF APPLICATION AND PRIOR ART

The invention relates to a device and method for degassing and gassing containers, in particular unsealed containers which have already been filled, in a packaging installation.

Since the shelf life of many products, in particular of foodstuffs, is impaired by oxygen and/or air humidity, it is generally known for packagings to be evacuated and subsequently sealed in gas-tight fashion. It is furthermore known to perform a gas exchange, that is to say the containers are firstly evacuated and are subsequently filled with an inert gas.

For a gas exchange, an installation for degassing and gassing containers is known for example from EP 0 566 173 A1, said installation comprising a carousel which transports the containers and which has a multiplicity of positions which each have a carrier plate and are each closable by means of a bell housing by virtue of the carrier plate being raised. Each bell housing has a connection opening which ends in a disk which is arranged above the carousel and which rotates with the carousel. Arranged adjacent to the rotating disk is a static disk with connections for a vacuum pump and a gas feed, wherein, on the static disk, there are provided slots via which the connections which end at the rotating disk are placed in communication, in a manner dependent on the position of the carousel, with the vacuum pump for a degassing process or with the gas feed for a gassing process.

Problem and Solution

A problem addressed by the invention is that of providing a device and a method for degassing and gassing containers with a high degree of process quality.

Said problem is solved by means of the device as claimed in claim 1 and the method as claimed in claim 10.

According to a first aspect, a device is provided for degassing and gassing containers, comprising at least one chamber in which an open container can be received for a degassing and/or gassing process, wherein a cover element for the received open container is provided in the chamber, wherein the cover element can, for a degassing and/or gassing process, be placed sealingly onto a container edge of the received open container or inserted sealingly into an interior space of the received open container, and wherein the cover element has at least one opening for a passage of gas.

During a degassing or gassing of products in particular in powder form, such as milk powder, it is possible for product particles to be swirled up and suctioned with air to be removed from the container or subsequently blown out again with an introduced gas. The cover element serves to prevent product particles from being deposited on a container edge or on an interior space adjoining the container edge.

The cover element is adapted in terms of its shape to the shape of the container. The container has, for example, a circular cross section. Here, in one embodiment, a ring-shaped cover element with a likewise circular opening is provided. An opening dimension of the opening of the cover element is, in one embodiment, approximately equal to an opening dimension of the opening of the container, wherein the cover element serves merely to protect the container edge against contamination.

It has however been found that a possible loss of product owing to suctioned particles can, in the case of certain products, be reduced if an opening via which an interior of the container is placed in communication with the surroundings is as small as possible. Therefore, in specific embodiments, provision is made whereby an opening dimension of the one opening is smaller than an opening dimension of the container.

In one embodiment, for a uniform flow distribution during the degassing and/or gassing process, the cover element has multiple openings distributed over a surface of the cover element. A collective opening dimension of the openings is in this case smaller than an opening dimension of the container.

In one embodiment, in order to further reduce a loss of product and/or contamination of the chamber, a filter element is provided at the at least one opening of the cover element. The filter element is configured for example as a lattice or fabric, in particular as a metal lattice or fabric. If the cover element lies on the container both during a degassing process and during a subsequent gassing process, the filter element is cleaned by the feed of gas during the gassing process, wherein a contamination of containers which are subsequently received in the chamber with remaining product particles is prevented.

The filter element can be suitably selected by a person skilled in the art in accordance with a product to be packaged, for example in a manner dependent on a particle size.

For variable use of the device, the filter element is preferably received exchangeably on the cover element.

In order to introduce the container into the chamber, the chamber is suitably designed in accordance with the usage situation, for example with a lateral access opening, a movable base or the like. In advantageous embodiments, the chamber has, for the introduction of the container, a bell housing, wherein the bell housing is mounted so as to be displaceable in a vertical direction and can be respectively raised and lowered for the purposes of opening and closing the chamber. The size of the bell housing defines a working space for a degassing or gassing process. For a minimization of the working space in the case of different container sizes, it is possible in one embodiment for an insert to be attached to the bell housing, by means of which insert the working space can be reduced in size for relatively small container sizes.

In one embodiment, the cover element is mounted, preferably mounted so as to be adjustable in a vertical direction, on the bell housing. Here, the cover element can be lowered with the bell housing onto the container, wherein a height of the cover element relative to a standing surface is preferably adjustable for different container sizes. In one embodiment, the cover element is additionally mounted so as to be adjustable relative to the bell housing in order to press the cover element against the container edge for a reliable sealing action.

In one embodiment, a gas exchange occurs via an edge that remains between the bell housing and a standing surface. In advantageous embodiments, at the at least one chamber, there is/are provided at least one, preferably two, connection openings for gas exchange which is/are connectable to a vacuum pump and/or to a gas supply for a degassing and/or gassing process.

In one embodiment, the chamber is arranged so as to be static, wherein containers are introduced into the chamber and are removed from the chamber after a gas exchange has occurred. In other embodiments, the chamber is provided on a transport system, in particular a carousel with an axis of rotation and a number N of positions distributed over a circumference of the carousel. Here, a gas exchange is possible in a continuous process. A raising and lowering of a bell housing assigned to the chamber is realized here for example by means of a slotted-guide track.

According to a second aspect, a method is provided for degassing and gassing a container, wherein the container is, for a degassing and/or gassing process, introduced in an open state into a chamber, wherein, for a degassing and/or gassing process, a cover element provided in the chamber is placed sealingly onto a container edge of the open container or inserted sealingly into an interior space of the container, and wherein a passage of gas occurs via at least one opening provided on the cover element. Here, the cover element is preferably arranged such that said cover element is placed or inserted during the closing of the chamber for a degassing and/or gassing process. It is however also conceivable for the cover element to be placed or inserted immediately prior to or after a closure of the chamber.

BRIEF DESCRIPTION OF THE DRAWINGS

Further advantages and aspects of the invention will emerge from the claims and from the following description of preferred exemplary embodiments of the invention, which are discussed below on the basis of the figures, in which, in each case schematically:

DETAILED DESCRIPTION OF THE EXEMPLARY EMBODIMENTS

Figure 1:
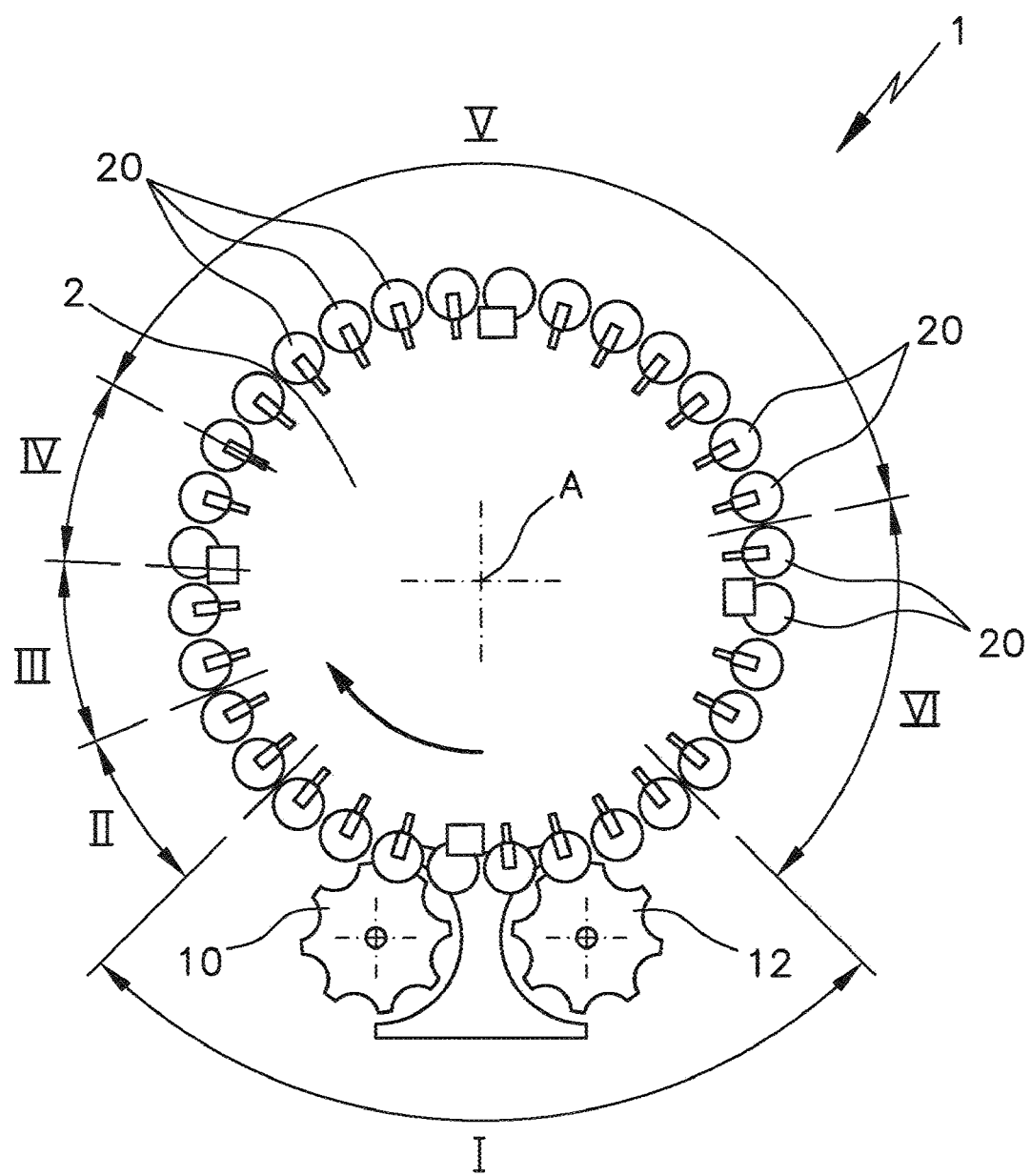
FIG. 1 shows a device for degassing and gassing containers, comprising a carousel, in a plan view.

FIG. 1 schematically shows, in a plan view, a device 1 for degassing and gassing containers. The device 1 is for example part of a packaging installation for foodstuffs and/or other products, in particular for milk powder, wherein, in the device 1, a gas exchange is performed by virtue of containers which have been filled with a product but which have not yet been sealed in gas-tight fashion being evacuated or degassed and subsequently filled or gassed with an inert gas, in particular N2, or a mixed gas, for example N2 and CO2.

The device 1 comprising a carousel 2 with an axis of rotation A and multiple, 32 in the exemplary embodiment illustrated, positions 20 distributed uniformly over the circumference. The carousel 2 can be rotated in an indexed or continuous manner about its axis of rotation A. In the exemplary embodiment illustrated, for a loading and unloading process, intake and discharge wheels 10, 12 are provided which run synchronously with the carousel 2. Other means for loading and unloading are however also conceivable.

A carousel 2 makes it possible to implement a continuous process, wherein it is possible for different process steps to be performed in a manner distributed over the circumference of the carousel 2. In the exemplary embodiment illustrated, six zones I to VI are provided.

In a first zone I of the carousel 2, loading or unloading of the carousel 2 with containers is performed.

The containers fed to the carousel 2 are, after a loading process, transported by rotation of the carousel 2 and pass through further zones, in the illustrated exemplary embodiment five zones I to V. In the exemplary embodiment illustrated, degassing occurs in multiple, specifically four, zones II, III, IV and V, wherein different pressure levels are applied in the zones II, III, IV and V, such that an evacuation of the containers occurs in a stepped manner. Gassing with an inert gas occurs in a further zone VI. The containers are subsequently, in the first zone I, ejected and fed for example to a flanging installation (not illustrated) and sealed.

For a degassing of the containers, it has proven advantageous to implement, for example, a stepped increase of an applied vacuum pressure proceeding from ambient pressure to a final pressure p of for example p<50 mbar in four steps, wherein the length of the final zone V along the circumference, and thus a dwell time of the containers in said zone V, is selected to be greater than the length of the preceding zones II to IV. The stepped application of the vacuum pressure has the effect that, in the case of a product in powder form, a so-called powder bed briefly expands, whereby ventilation is possible even at lower layers in the powder. Gassing is performed preferably with a slight positive pressure.

In the exemplary embodiment illustrated, the zones II to IV each have the same length extending across two positions. Other configurations are however also conceivable. A dwell time in the zones is dependent on the length thereof and on a rotational speed. In one embodiment, the zones are selected such that, in the case of a constant rotational speed, the dwell time in the zones II to IV is equal in each case, the dwell time in the zone V amounts, in the exemplary embodiment, to approximately 10 times the dwell time in the zones II to IV, and the dwell time in the zone VI amounts to approximately four times the dwell time in the zones II to IV. The illustrated dwell times are however merely examples.

For a degassing process and subsequent gassing process, the positions 20 are closed, in particular closed in gas-tight fashion.

Figure 2:
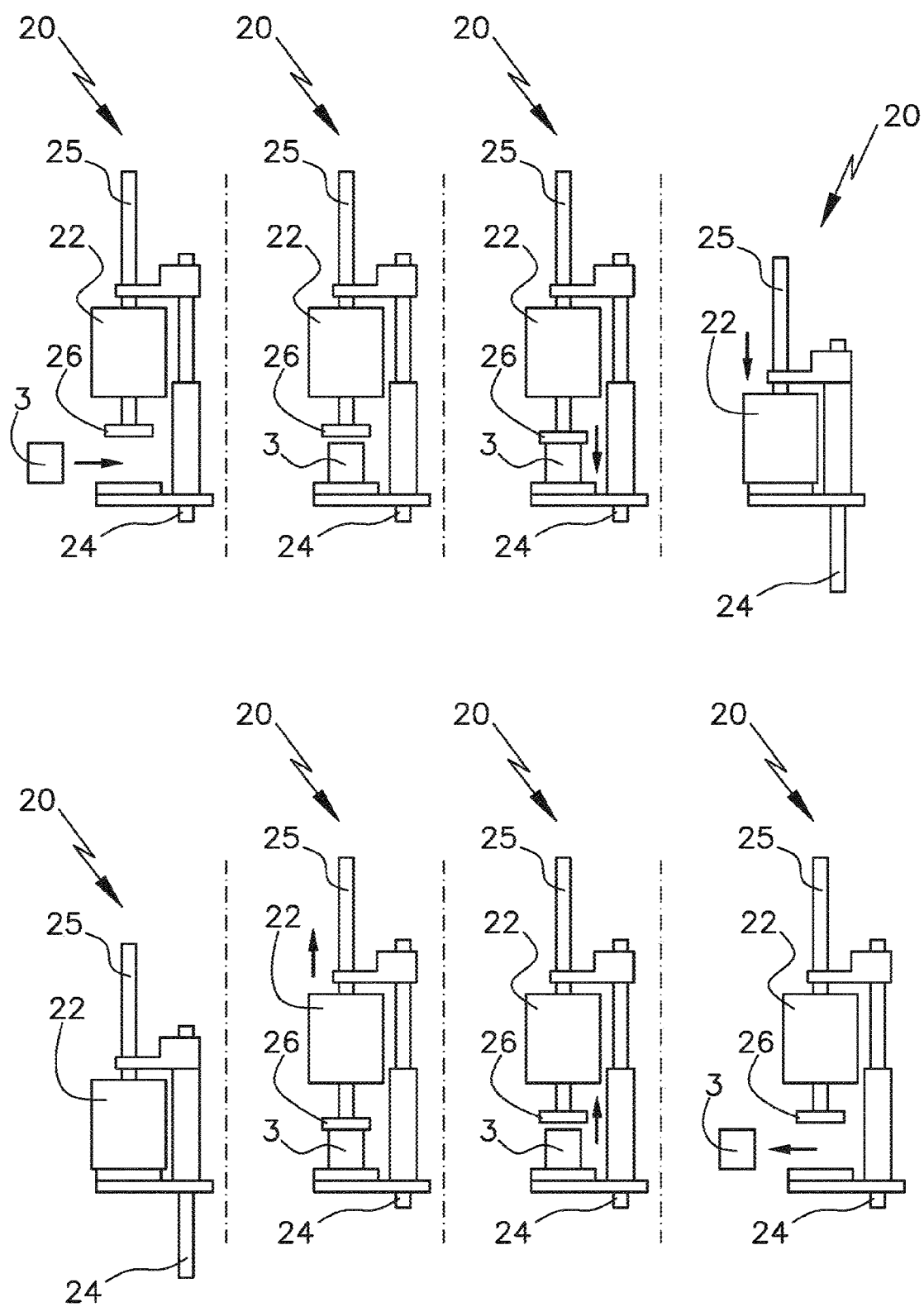
FIG. 2 schematically shows a sequence during the loading, closing, opening and unloading of a position of the carousel as per FIG. 1.

FIG. 2 schematically shows a sequence during the loading, closing, opening and unloading of a position 20 of the carousel 2 as per FIG. 1. At the position 20, a bell housing 22 is provided which, by means of a shifting rod 24 which is guided in a slotted guide (not illustrated), is lowered for the purposes of closing the position 20 and, after a gas exchange has occurred, is raised again for the purposes of unloading the position 20. The bell housing 22 forms, together with a base 21 of the position 20, a chamber for receiving the container. For a gas exchange in the chamber, there is provided at each position 20 at least one connection opening (not illustrated in FIG. 2) via which an interior space of the position 20 closed by means of the bell housing 22 is connectable to a vacuum pump for an evacuation and/or supply of gas for a gassing process. In the exemplary embodiment illustrated, the base 21 has an encircling edge onto which the bell housing 22 is sealingly mounted. The base 21 serves as a transport plane for the container 3 during a rotation of the carousel 2.

In the exemplary embodiment illustrated, containers 3 are fed to the position 20 in a filled but unsealed state. It has however been found that any loss of product owing to suctioned particles can be reduced if an opening via which an interior of the container is placed in communication with the surroundings is as small as possible. It is therefore known for a cover to already be placed onto the container 3, but for the cover to not yet be connected in gas-tight fashion to the container 3. Here, the gas-tight connection is made only after the gas exchange. For processing of containers 3 without a cover placed thereon in the exemplary embodiment illustrated, a cover element 26 is provided on the bell housing 22, which cover element is placed onto the open container 3.

For a movement of the cover element 26 relative to the bell housing 22, a plunger 25 is provided, wherein an adaptation of a height of the cover element 26 when in a placed state for containers 3 of different size is also possible by means of the plunger 25. In order, in the case of very small containers 3, to reduce an internal volume of the position 20 closed by means of the bell housing 22, in one embodiment, an insert (not illustrated) is provided in the interior space of the bell housing 22. The cover element 26 will be described in more detail further below in conjunction with FIG. 3.

Figure 3:
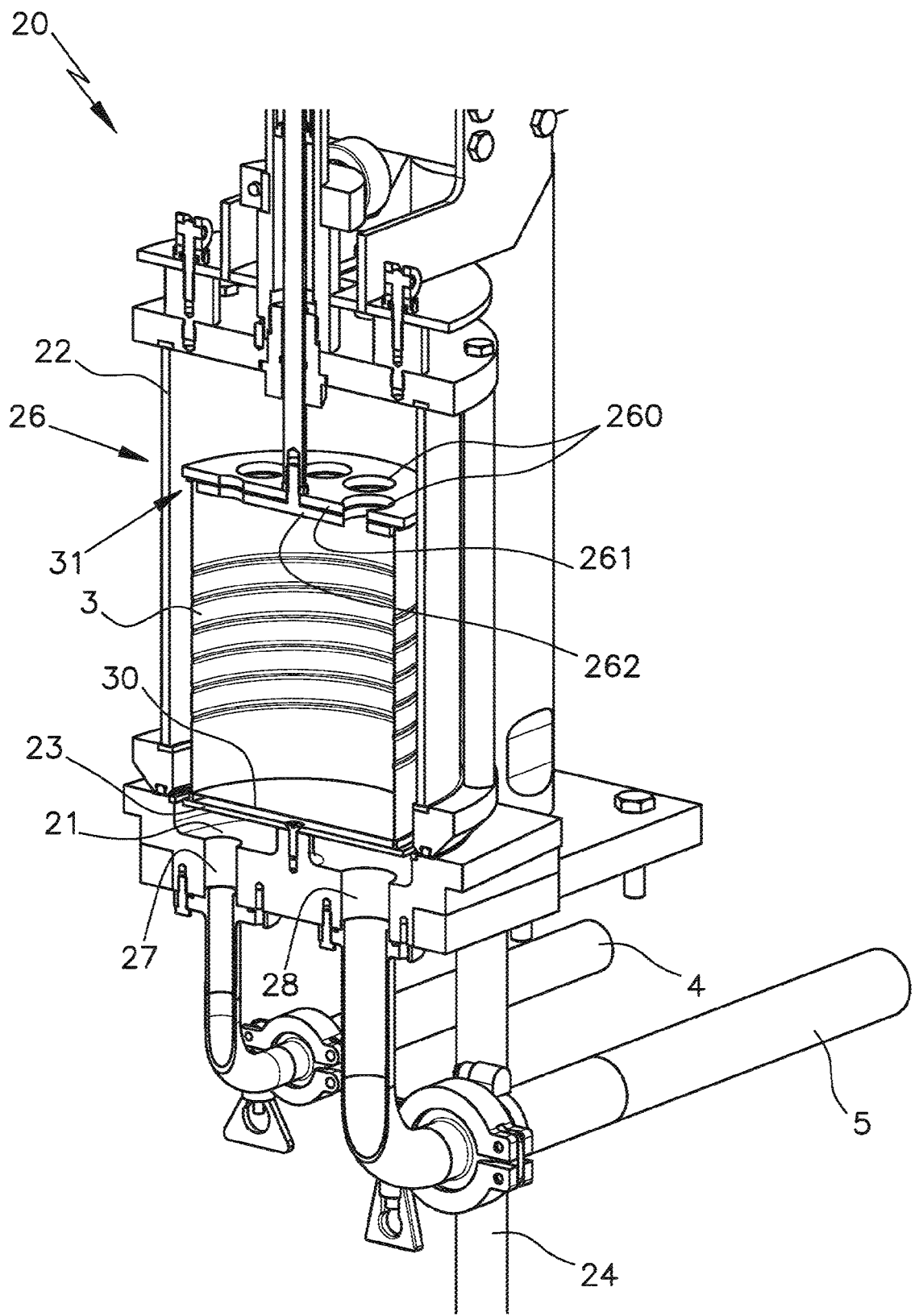
FIG. 3 shows a sectional view of a position, closed by means of a bell housing, of the carousel as per FIG. 1.

FIG. 3 schematically shows, in a sectional view, an embodiment of a position 20, closed by means of a bell housing 22, of the carousel as per FIG. 2, with a received container 3.

As described above, in the exemplary embodiment illustrated, a cover element 26 is provided on the bell housing 22, which cover element is placed onto the open container 3. The cover element 26 illustrated has a plurality of circular openings 260, via which an interior space of the container 3 is connected to the surroundings when the cover element 26 has been placed thereon. In the exemplary embodiment illustrated, the cover element 26 comprises two disks 261, 262, wherein a filter element is inserted between the disks 261, 262. In other embodiments, a filter element is omitted and/or a disk which also functions as a filter element is provided. In one embodiment, as a filter element, a fabric, in particular a metal fabric, with a mesh size of approximately 10 µm to approximately 100 µm is provided. A mesh size and/or a material of the fabric can be selected by a person skilled in the art in a manner dependent on the product, for example in a manner dependent on a powder class. The filter element permits a degassing process but reduces an escape of product. Any particles which accumulate on the filter element during a degassing process are in this case detached again by the feed of gas during the gassing process. Thus, during a gassing process via the filter element, the cleaning of said filter element occurs at the same time. In one embodiment, a cleaning device for the filter element is additionally provided in the region of the first zone I as per FIG. 1. Alternatively and/or in addition, an exchange of the filter element is possible during a product change.

The illustrated cover element 26 lies sealingly against a container edge 31, such that a gas exchange occurs exclusively via the openings 260. In this way, contamination of the edge of the container 3 by particles of the product that are suctioned during the degassing process is prevented.

As mentioned, every position has at least one connection opening for the connection to a vacuum pump and/or to a gas supply. In the exemplary embodiment illustrated in FIG. 3, an intermediate base 23 with passage openings is provided, on which intermediate base the container 3 stands, such that a container base 30 is spaced apart from the base 21 with the connection openings. On the base 21, there is provided a first connection opening 27 by means of which the position 20 can be placed in communication with a gas supply. For this purpose, a first line 4 is connected to the connection opening 27, which first line is moved with the position 20 about a central axis of the carousel 2. A gas exchange occurs for example by displacement of the air present at the position 2. In the embodiment illustrated, a second connection opening 28 is provided on the base 21, by means of which second connection opening the position 20 can be placed in communication with a vacuum pump. For this purpose, a second line 5 is connected to the connection opening 28, which second line is likewise moved with the position 20 about the central axis of the carousel 2.

The lines 4, 5 extend preferably at least substantially radially with respect to a central axis of the carousel 2 as per FIG. 1.

Figure 4:
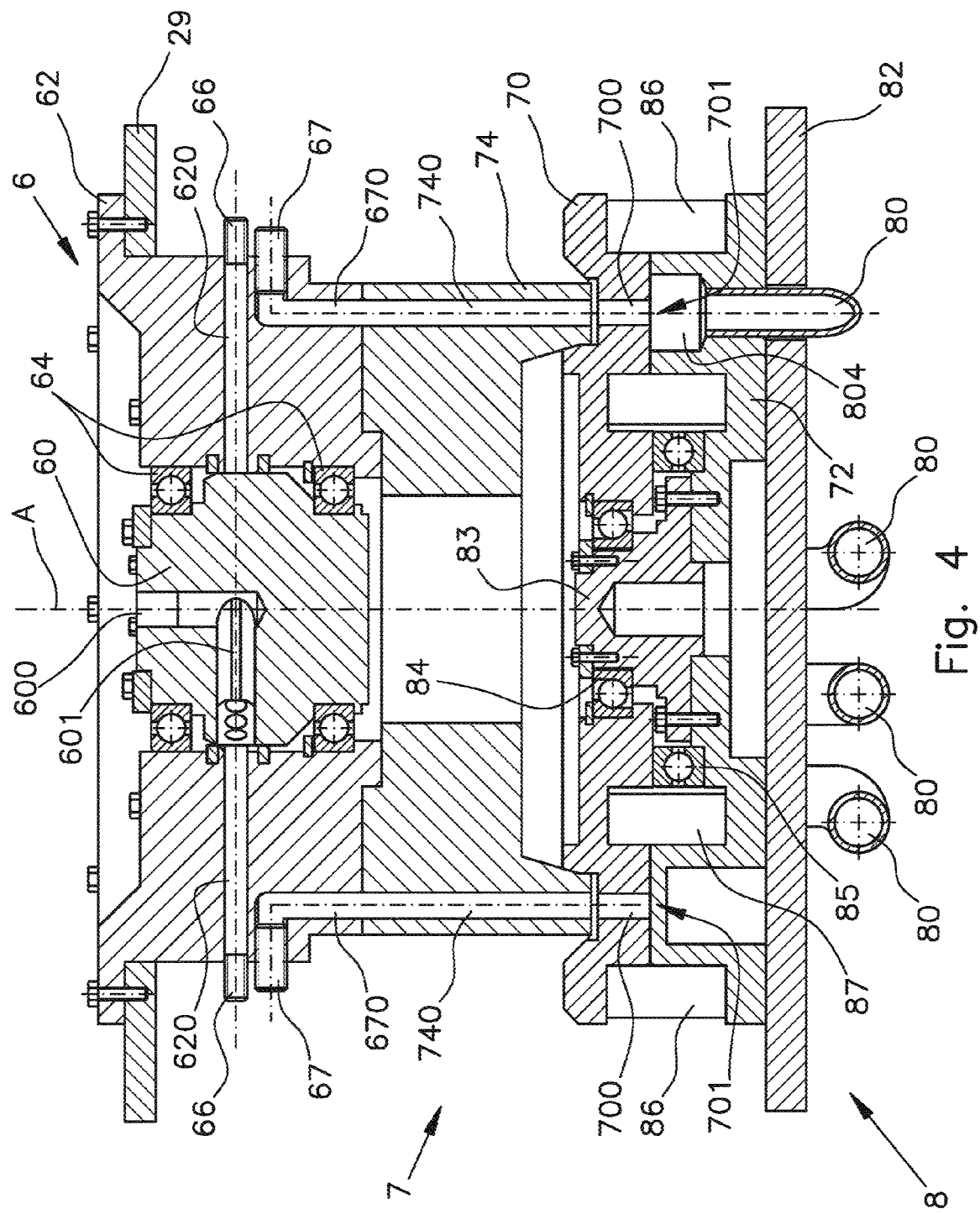
FIG. 4 shows a sectional view of an axle of the carousel as per FIG. 1 with a means for a feed of media and discharge of media comprising a rotating connection assembly and a stator disk.

FIG. 4 shows, in a sectional view, a central axis A of the carousel 2 as per FIG. 1 with a first rotary leadthrough 6 for a gas feed and a second rotary leadthrough 7 for a degassing process.

The first rotary leadthrough 6 is designed as a radial rotary leadthrough 6 and comprises a stator 60 and a rotary body 62 which rotates with the carousel 2 and which surrounds the stator 60. The rotary body 62 is for example connected, as illustrated, to a rotary plate 29 of the carousel, for example by means of a screw connection. The rotary body 62 rotates about the stator 60. In the exemplary embodiment illustrated, the rotary body 62 is supported on the stator 60 by means of two rolling bearings 64. In other embodiments, plain bearings are provided.

On the rotary body 62, there are provided channels 620 which extend radially through the rotary body 62 and which have the first connection pieces 66 for the connection to the first connection openings 27 of the positions 20 as per FIGS. 1 to 3. The connection is realized by means of suitable first lines 4, in the form of hose or pipe pieces or the like. For use with a carousel 2 with 32 positions 20, 32 first connection pieces 66 are provided, of which however only two first connection pieces 66, with channels 620 connecting thereto, are visible in the sectional view in FIG. 4.

The stator 60 has a connection opening 600 for the connection to a gas feed (not illustrated) and has a channel 601 which is fluidically connected to the connection opening 600. The channel 601 has a first portion, extending in an axial direction, and a second portion, extending in a radial direction. The portion extending in the radial direction is arranged a a level with the channels 620 of the rotary body 62, such that the channel 601 of the stator 60 is connected to at least one of the channels 620 of the rotary body 62 for a passage of gas.

Figure 5:
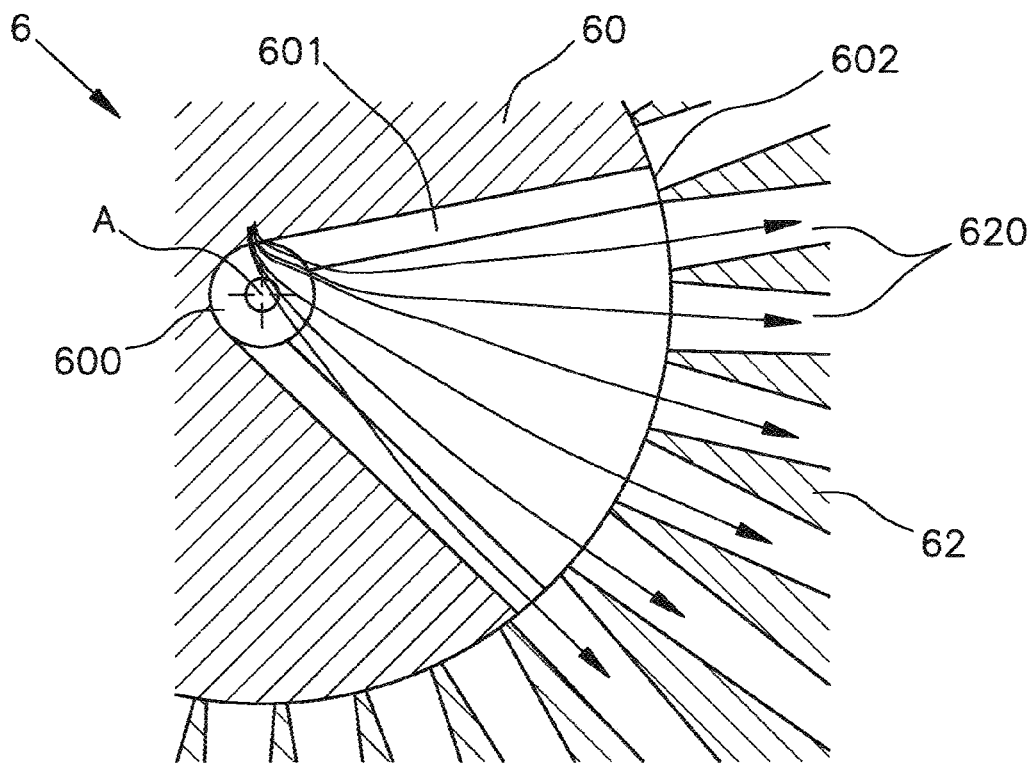
FIG. 5 shows a detail of a first rotary leadthrough for a gas feed in a sectional illustration.

FIG. 5 schematically shows, in a sectional illustration, a detail of an embodiment of the rotary leadthrough 6 as per FIG. 4 comprising the stator 60 with the channel 601 and comprising the rotary body 62 with multiple channels 620 extending radially with respect to the central axis A. As can be seen in FIGS. 4 and 5, the channels 620 of the rotary body 62 end at the stator 60. The illustrated stator 60 has a channel 601 with a sector-shaped cutout, which adjoins the central connection opening 600, and with a mouth 602 which extends circumferentially along a circular arc. A gas used for the gassing process is fed via the central connection opening 600 to the channels 620 which are situated in the region of the mouth 602. By rotation of the rotary body 62 with the channels 620 about the central axis A, the positions 20 are successively placed in communication with the gas supply in a manner dependent on a rotational angle position. The length of the mouth can in this case be suitably selected by a person skilled in the art in accordance with the usage situation for a desired duration of the feed of gas.

For a degassing process, it would be conceivable for one or more further channels to be provided on the stator 60, which channel(s) is/are connectable to one or more vacuum pumps and is/are likewise connected to one or more of the channels 620 of the rotary body 62 for a passage of gas.

In the exemplary embodiment illustrated in FIG. 4, a second rotary leadthrough 7 is provided for a degassing process. The second rotary leadthrough 7 is designed as an axial rotary leadthrough 7 and comprises a rotary disk 70, which rotates with the carousel 2, and a stator disk 72. The rotary disk 70 has channels 700 which extend axially through the rotary disk 70 and which issue into openings 701 at a top side adjoining the stator disk 72.

Connections 80 for vacuum pumps (not illustrated) are provided on the stator disk 72. In the exemplary embodiment illustrated, connections 80 are provided for four vacuum pumps. The stator disk 72 is arranged on a mounting plate 82. A journal 83 is provided on the stator disk 72, wherein the rotary disk is supported on the journal 83 by means of a suitable rolling bearing 84.

In the illustrated exemplary embodiment, a rolling bearing 85 is likewise provided between the stator disk 72 and the rotary disk 70. The stator disk 72 and the rotary disk 70 have ring-shaped projections arranged coaxially, wherein the stator disk 72 and the rotary disk 70 make contact in the region of the ring-shaped projections, or a gap remains between the stator disk 72 and the rotary disk 70. Static sliding sleeves 86, 87 are provided to both sides of the projections as viewed in a radial direction. The sliding sleeves 86, 87 serve both for guidance of the rotary disk 70 and for sealing of the axial rotary leadthrough with respect to the surroundings.

In the exemplary embodiment illustrated, connection pieces 67 for the lines 5 (cf. FIG. 3) connected to the second connection openings 28 are provided on the rotary body 62. The connection pieces 67 are assigned channels, with portions 670 extending in an axial direction, in the rotary body 62, which channels are oriented in alignment with respect to the channels 700 of the rotary disk 70. Furthermore, between the rotary body 62 and the rotary disk 70, there is provided a sleeve 74 which rotates with the rotary body 62 and the rotary disk 70, which sleeve has channels 740 which extend through the sleeve 74 in an axial direction.

For a degassing process, the positions 20 (cf. FIG. 3) are in each case connectable by means of the axial rotary leadthrough 7 to a vacuum pump which is connected to the connections 80.

Figure 6:
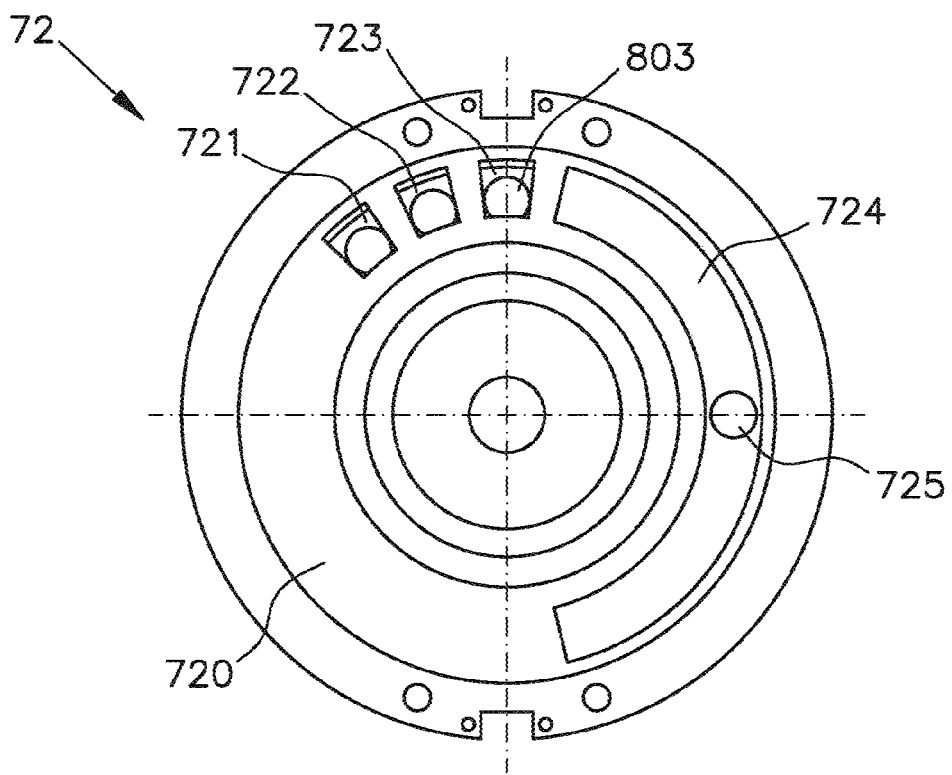
FIG. 6 shows the stator disk of the media feed and discharge means as per FIG. 4 in a plan view.

FIG. 6 shows the stator disk 72 in a plan view. The stator disk 72 comprises a top side 720 which faces toward the rotary disk 70 as per FIG. 4 during use and on which, in the exemplary embodiment illustrated, there are provided four cutouts 721, 722, 723, 724. At each cutout 721, 722, 723, 724, there is provided an opening 725 for a connection 80 as per FIG. 4, via which the cutouts 721, 722, 723, 724 are in each case placed in communication with a vacuum pump.

During a rotation of the rotary disk 70 as per FIG. 4, the openings 701 of the rotary disk 70 pass into the region of one of the cutouts 721, 722, 723, 724, as illustrated on the right in FIG. 4, such that an associated connection piece 67 is placed in communication with a vacuum pump connected to the cutout 724. In other rotational angle positions of the rotary disk 70, the opening 701 of said position is, as illustrated on the left in FIG. 4, closed by the top side 720 of the disk 72. In the exemplary embodiment illustrated, by means of the four cutouts 721, 722, 723, 724, four zones (cf. FIG. 1) are realized along a circumference of the carousel 2, which zones are assigned in each case one vacuum pump. Each vacuum pump can be suitably designed for achieving the vacuum pressure to be achieved in the zone.

In the exemplary embodiment illustrated, separate systems are provided for a feed of gas and an evacuation of the positions 20. This has the advantage that particles which are possibly suctioned into the second lines 5 and downstream components during an evacuation are not blown to the position 20 during a subsequent feed of gas.

The embodiment illustrated in FIG. 4, in which the rotary disk 70, the rotary body 62 and the sleeve 74 are manufactured as separate components, is advantageous both with regard to the manufacturing process and with regard to structural space utilization. It is however evident to a person skilled in the art that, in a modified embodiment of the rotary body 62, the sleeve 74 and the rotary disk 70 may also be designed as a common component, and/or a sleeve 74 may be omitted.

In the exemplary embodiment illustrated, the axial rotary leadthrough 7 is arranged below the radial rotary leadthrough 6 and below a rotary plate 29 of the carousel, wherein vacuum pumps for the axial rotary leadthrough 7 are connected from below, and a feed of gas to the radial rotary leadthrough 6 occurs from above.

In the exemplary embodiment illustrated in FIG. 4, the axial rotary leadthrough comprising the rotary disk 70 and the stator disk 72 can be dismounted for cleaning. For this purpose, the rotary disk 70 and the sleeve 74 have shaft coupling elements which are complementary to one another, such that dismounting is possible in particular by lowering the mounting plate with the stator disk 72 and the rotary disk 70 relative to the rotary plate 29 of the carousel 2. For straightforward mounting without alignment errors, the rotary disk 70 and the sleeve 74 have conical abutment surfaces, by means of which centering occurs during a mounting process.

The exemplary embodiments illustrated in the figures are merely exemplary, and individual parts of the illustrated means may be combined with other means in order to create further embodiments. For example, in one alternative embodiment, the position illustrated in FIG. 2 is provided not as part of a carousel but rather in a static manner and/or on a linear transport system.

What is claimed is:

1. A device for degassing and gassing containers, comprising at least one chamber in which an open container can be received for a degassing and/or gassing process,
   wherein the chamber has a bell housing, which together with a base forms the chamber,
   wherein the bell housing is mounted so as to be displaceable in a vertical direction and can be respectively raised and lowered for the purposes of opening and closing the chamber,
   wherein a first connection opening is provided at the base, by means of which the first connection opening the chamber can be placed in communication with a gas supply, wherein a second connection opening is provided at the base, by means of which the second connection opening the chamber can be placed in communication with a vacuum pump, wherein a cover element for the received open container is provided in the chamber, wherein the cover element is mounted on the bell housing, wherein the cover element has at least one opening for a passage of gas, and wherein the cover element can, for a degassing and/or gassing process, be placed sealingly onto a container edge of a received open container or inserted sealingly into an interior space of a received open container, such that a passage of gas into and out of the container during gassing and degassing occurs exclusively via the at least one opening provided on the cover element.

2. The device as claimed in claim 1, wherein the cover element has multiple openings distributed over a surface of the cover element.

3. The device as claimed in claim 1, wherein a filter element is provided at the at least one opening of the cover element.

4. The device as claimed in claim 3, wherein the filter element is configured as a lattice or fabric.

5. The device as claimed in claim 4, wherein the filter element is configured as a metal lattice or fabric.

6. The device as claimed in claim 3, wherein the filter element is received exchangeably on the cover element.

7. The device as claimed in claim 1, wherein the chamber is provided on a transport system.

8. The device as claimed in claim 1, wherein the cover element is mounted so as to be adjustable in a vertical direction.

9. The device as claimed in claim 1, wherein the chamber is provided on a carousel with an axis of rotation and a number N of positions distributed over a circumference of the carousel.

10. The device as claimed in claim 1, wherein an intermediate base is provided, on which intermediate base the container stands, such that a container base is spaced apart from the base with the first connection opening and the second connection opening.

11. A method for degassing and gassing a container, wherein the container is, for a degassing and/or gassing process, introduced in an open state into a chamber, wherein, for a degassing and/or gassing process, wherein the chamber has a bell housing, which together with a base forms the chamber, wherein the bell housing is mounted so as to be displaceable in a vertical direction and is respectively raised and lowered for the purposes of opening and closing the chamber, wherein a first connection opening and a second connection opening are provided at the base, the method comprising closing the chamber by lowering the bell housing, placing a cover element provided in the chamber and mounted to the bell housing sealingly onto a container edge of the open container or inserting the cover element sealingly into an interior space of the open container, communicating the chamber via the second connection opening with a vacuum pump for a degassing, communicating the chamber via the first connection opening with a gas supply for a gassing, wherein a passage of gas out of and into the container during degassing and/or gassing of the container occurs exclusively via at least one opening provided on the cover element.

* * * * *